US012087991B2

(12) United States Patent
Uemichi

(10) Patent No.: US 12,087,991 B2
(45) Date of Patent: Sep. 10, 2024

(54) SUBSTRATE INTEGRATED WAVEGUIDE DEVICE INCLUDING A RESONANCE REGION THEREIN COUPLED BY CONDUCTOR POSTS TO FIRST AND SECOND LINES AND A TRANSISTOR COUPLED BETWEEN THE FIRST AND SECOND LINES

(71) Applicant: FUJIKURA LTD., Tokyo (JP)

(72) Inventor: Yusuke Uemichi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 414 days.

(21) Appl. No.: 17/431,221

(22) PCT Filed: Apr. 7, 2020

(86) PCT No.: PCT/JP2020/015657

§ 371 (c)(1),
(2) Date: Aug. 16, 2021

(87) PCT Pub. No.: WO2020/209250

PCT Pub. Date: Oct. 15, 2020

(65) Prior Publication Data

US 2022/0013880 A1 Jan. 13, 2022

(30) Foreign Application Priority Data

Apr. 11, 2019 (JP) ................................ 2019-075660

(51) Int. Cl.
*H01P 5/107* (2006.01)
*H01P 1/203* (2006.01)
(Continued)

(52) U.S. Cl.
CPC .......... *H01P 5/107* (2013.01); *H01P 1/20309* (2013.01); *H01P 1/2088* (2013.01); *H01P 3/082* (2013.01); *H01P 5/085* (2013.01)

(58) Field of Classification Search
CPC .......... H01P 5/085; H01P 3/088; H01P 5/107; H01P 1/2088
(Continued)

(56) References Cited

U.S. PATENT DOCUMENTS 4,494,083 A * 1/1985 Josefsson et al. ........ H01P 5/08 333/33
4,626,800 A 12/1986 Murakami et al.
(Continued)

FOREIGN PATENT DOCUMENTS

JP 2001-144511 A 5/2001
JP 2017-60104 A 3/2017
JP 2018-23088 A 2/2018

OTHER PUBLICATIONS

Huang, Qingchou et al., "A Shielded Microstrip-to-Stripline Vertical Transition for Multilayer Printed Circuit Board", 2012 International Conference on Microwave and Millimeter Wave Technology (ICMMT), 2012.

(Continued)

*Primary Examiner* — Benny T Lee
(74) *Attorney, Agent, or Firm* — WHDA, LLP

(57) ABSTRACT

An aspect of the present invention reduces loss that may occur in cases where electromagnetic waves are guided from one main surface side of a substrate to the other main surface side of the substrate. A waveguide device (10, 10A, 20) includes: a substrate (11); a first conductor layer (12A) and a second conductor layer (12B) which are provided on both main surfaces of the substrate, respectively; a main conductor post (MP) which penetrates between the both main surfaces; and one or more sub-conductor posts (SP) which penetrate between the both main surfaces and which, together with the main conductor post, guide a TEM mode or a quasi-TEM mode.

7 Claims, 6 Drawing Sheets

Figure 1:
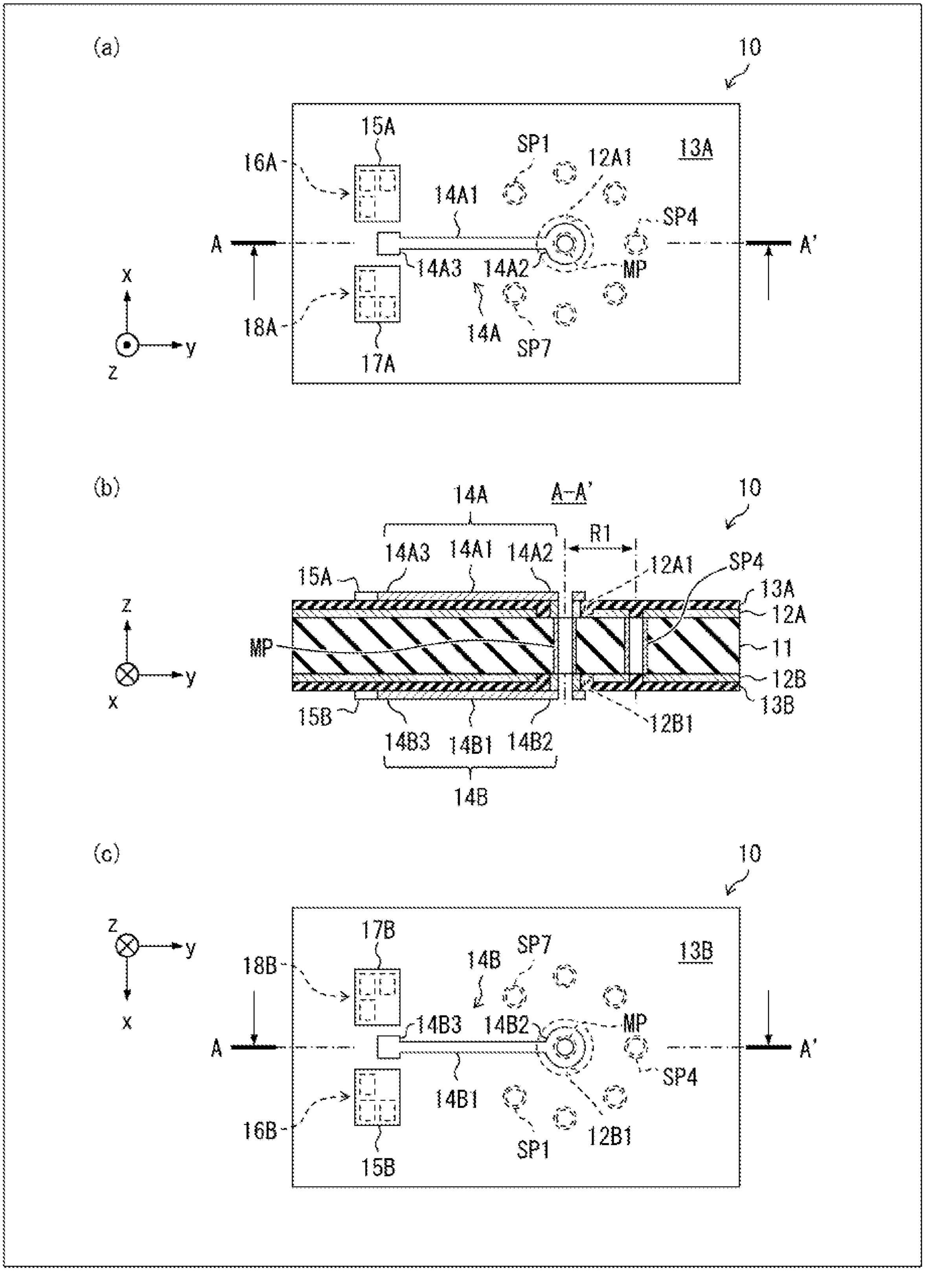

(51) Int. Cl.
*H01P 1/208* (2006.01)
*H01P 3/08* (2006.01)
*H01P 5/08* (2006.01)

(58) Field of Classification Search
USPC .................................................... 333/33, 246
See application file for complete search history.

(56) References Cited

U.S. PATENT DOCUMENTS

| | | | | |
|---|---|---|---|---|
| 5,057,798 | A * | 10/1991 | Moye et al. | ............ H01P 3/084 333/33 |
| 6,023,211 | A * | 2/2000 | Somei | ..................... H01P 3/081 174/262 |
| 6,154,106 | A | 11/2000 | De Lillo | |
| 2003/0133279 | A1 | 7/2003 | Shirasaki | |
| 2004/0069529 | A1 * | 4/2004 | Oggioni et al. | .......... H01P 3/06 174/262 |
| 2015/0325903 | A1 | 11/2015 | Kaneko et al. | |

OTHER PUBLICATIONS

Notification of Transmittal of Translation of the International Preliminary Report on Patentability (Form PCT/IB/338) issued in counterpart International Application No. PCT/JP2020/015657 mailed Oct. 21, 2021 with Forms PCT/IB/373 and PCT/ISA/237. (8 pages).
International Search Report dated Jun. 23, 2020, issued in counterpart Application No. PCT/JP2020/015657. (2 pages).

* cited by examiner

SUBSTRATE INTEGRATED WAVEGUIDE DEVICE INCLUDING A RESONANCE REGION THEREIN COUPLED BY CONDUCTOR POSTS TO FIRST AND SECOND LINES AND A TRANSISTOR COUPLED BETWEEN THE FIRST AND SECOND LINES

TECHNICAL FIELD

The present invention relates to a waveguide device which guides electromagnetic waves from one main surface side of a dielectric substrate to the other main surface side of the dielectric substrate.

BACKGROUND ART

Some of devices that handle electromagnetic waves belonging to centimeter-wave bands and millimeter-wave bands are waveguide devices that guide electromagnetic waves from one main surface side of a dielectric substrate to the other main surface side of the dielectric substrate. Devices that include such a waveguide device include, for example, interposers and oscillators.

Non-Patent Literature 1 (see FIG. 1) discloses a waveguide device which includes: a microstrip line (MS in FIG. 1 of the Non-Patent Literature) provided on a surface layer of a multilayer dielectric substrate; a strip line (SL in FIG. 1 of the Non-Patent Literature) provided in an inner layer; a via (Signal Via in FIG. 1 of the Non-Patent Literature) for connecting the microstrip line and the strip line to each other; a conductor layer (Ground Plane in FIG. 1 of the Non-Patent Literature) which serves as a common GND layer for the microstrip line and the strip line, which forms a line with each of the microstrip line and the strip line, and which has an opening for allowing the via to penetrate; and a plurality of blind vias which penetrate through the GND layer of the microstrip line and the GND layer of the strip line so as to surround the via.

CITATION LIST

Non-Patent Literature

Non-Patent Literature 1

Qingchou Huang, et. al., “A shielded microstrip-to-stripline vertical transition for multilayer printed circuit board”, 2012 International Conference on Microwave and Millimeter Wave Technology (ICMMT), 2012

SUMMARY OF THE INVENTION

Technical Problem

The waveguide device disclosed in FIG. 1 of Non-Patent Literature 1 is a waveguide device which guides electromagnetic waves from the surface layer to the inner layer of the multilayer dielectric substrate, as described above. It is possible to configure a waveguide device which guides electromagnetic waves from one main surface side of a substrate to the other main surface side of the substrate, by using a layer indicated to have a thickness of D2 and a layer indicated to have a thickness of D3 in FIG. 1 of Non-Patent Literature 1 and omitting a layer indicated to have a thickness of D1 in FIG. 1 of Non-Patent Literature 1.

With regard to such a waveguide device obtained by omitting the layer indicated to have a thickness of D1 from the waveguide device disclosed in FIG. 1 of Non-Patent Literature 1, the inventors of the present application considered that there is room for reduction of loss that may occur in cases where electromagnetic waves are guided from the one main surface side of the substrate to the other main surface side of the substrate.

An object of the present invention is to provide a waveguide device which guides electromagnetic waves from one main surface side of a substrate to the other main surface side of the substrate and which, as compared to a conventional waveguide device, can reduce loss that may occur.

Solution to the Problem

In order to solve the above problem, a waveguide device in accordance with Aspect 1 of the present invention includes: a substrate made of a dielectric; a first conductor layer and a second conductor layer which are formed on both main surfaces of the substrate, respectively; a main conductor post which penetrates between both main surfaces and which is not electrically connected to the first conductor layer or the second conductor layer; and one or more sub-conductor posts which penetrate between the both main surfaces and which form a short circuit between the first conductor layer and the second conductor layer, the one or more sub-conductor posts, together with the main conductor post, guiding a TEM mode or a quasi-TEM mode.

Advantageous Effects of the Invention

A waveguide device in accordance with an aspect of the present invention makes it possible to reduce loss that may occur in cases where electromagnetic waves are guided from one main surface side of a substrate to the other main surface side of the substrate.

BRIEF DESCRIPTION OF THE DRAWINGS (a) of FIG. 1 is a top view of a waveguide device in accordance with Embodiment 1 of the present invention; (b) of FIG. 1 is a cross sectional view of the waveguide device; and (c) of FIG. 1 is a bottom view of the waveguide device.

Figure 2:
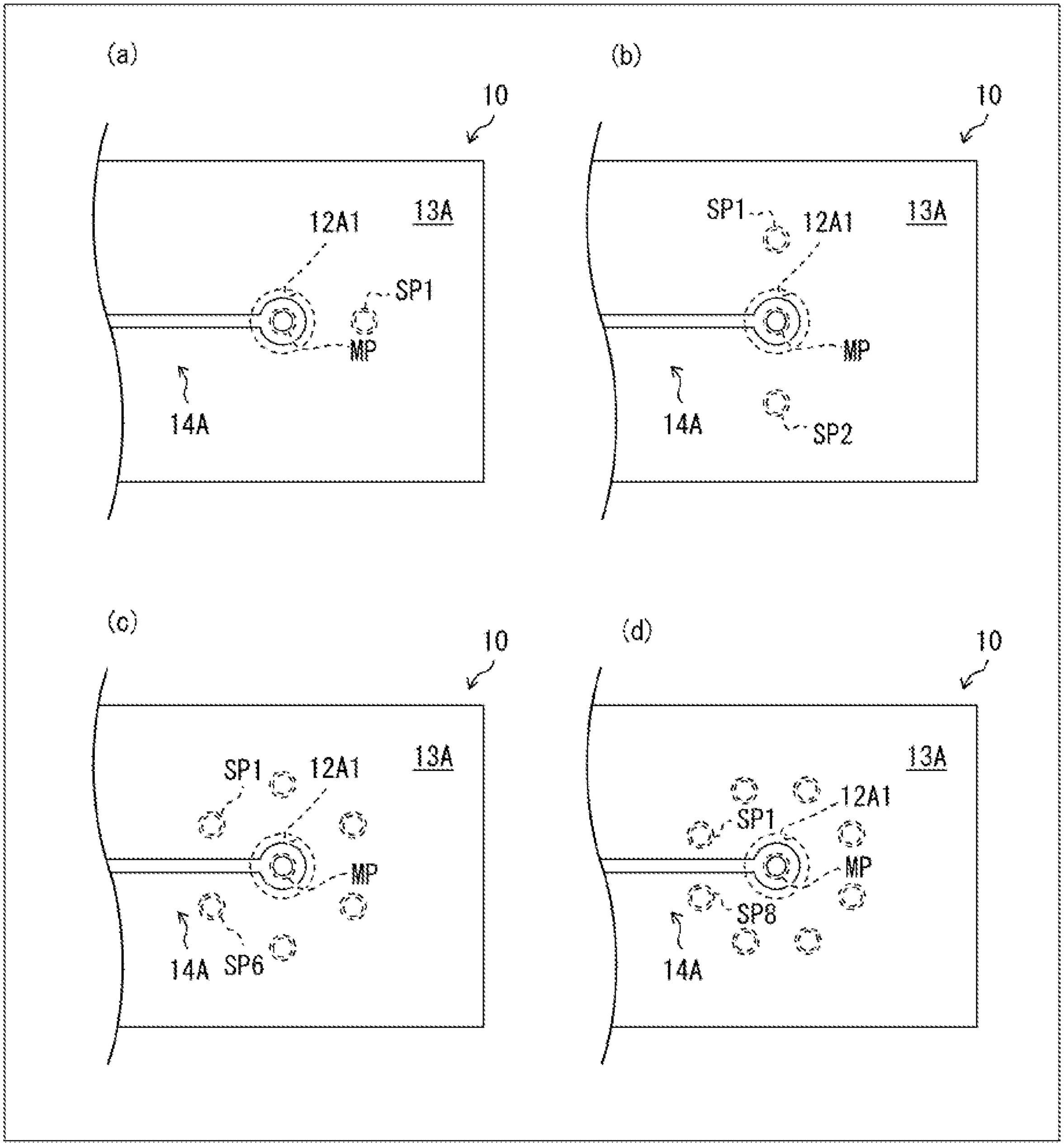

(a) to (d) of FIG. 2 are respective top views illustrating Variations 1 to 4 of the waveguide device illustrated in FIG. 1.

Figure 3:
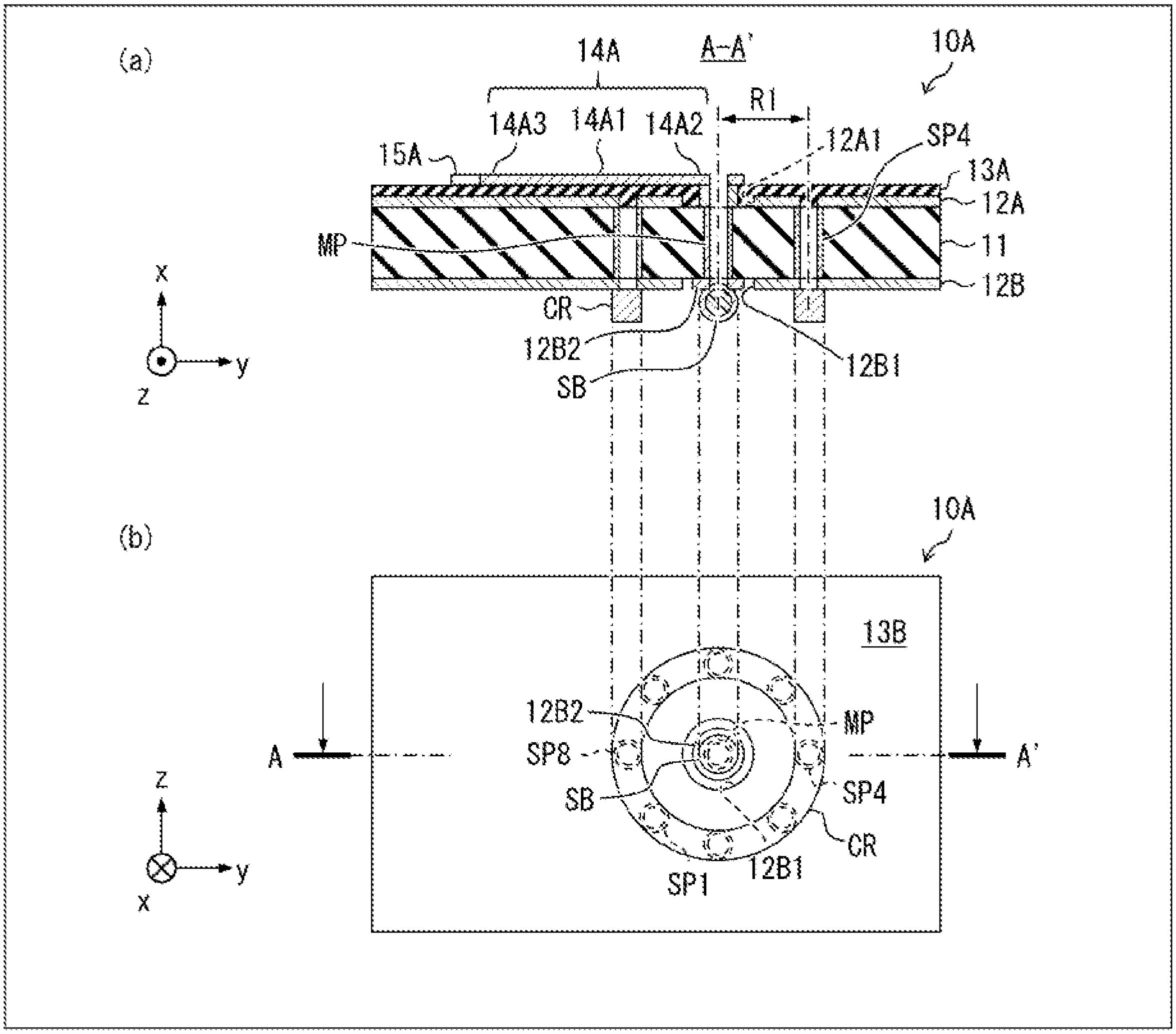

(a) of FIG. 3 is a cross sectional view of a waveguide device in accordance with Embodiment 2 of the present invention; and (b) of FIG. 3 is a bottom view of the waveguide device.

Figure 4:
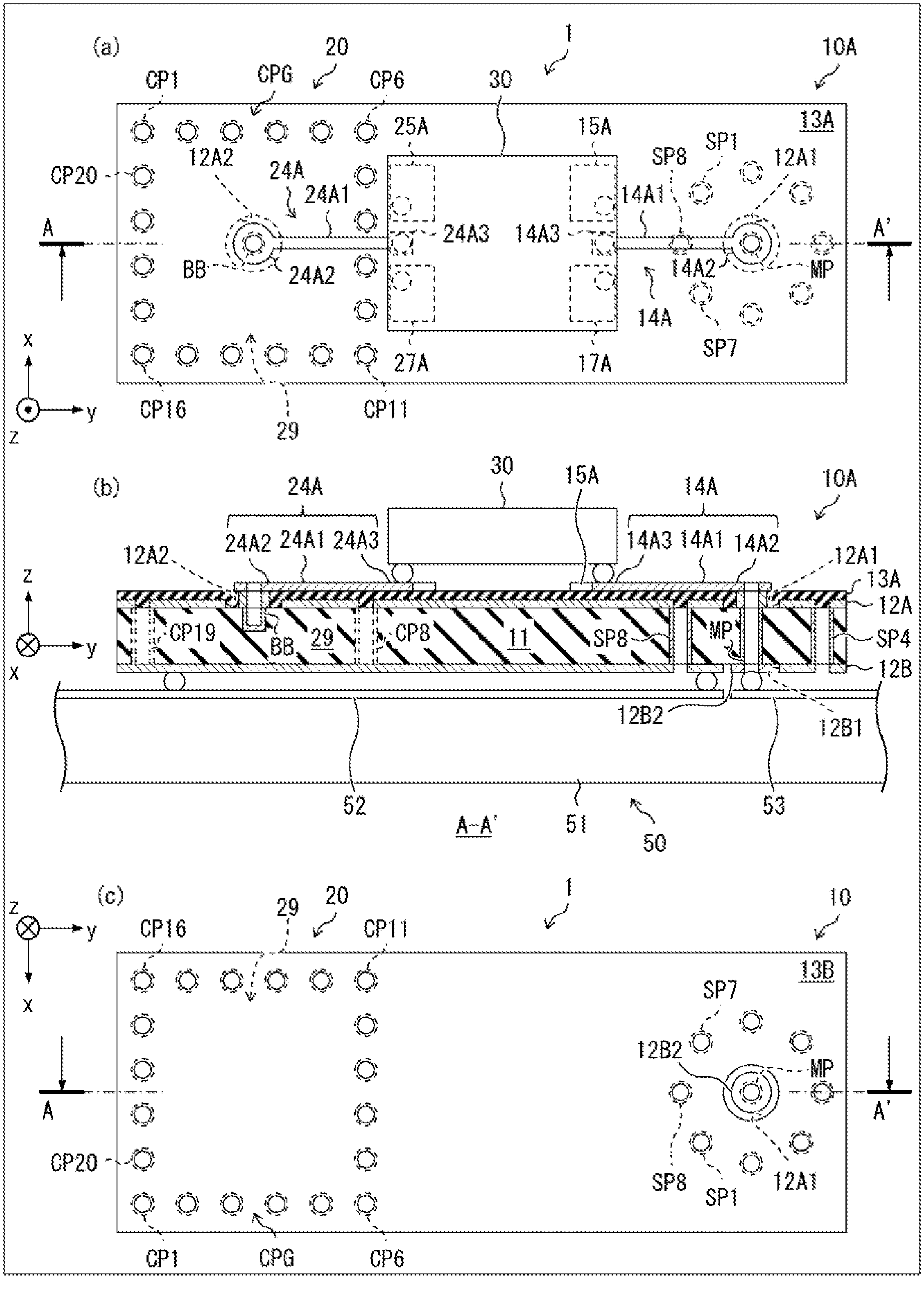

(a) of FIG. 4 is a top view of an oscillator in accordance with Embodiment 3 of the present invention; (b) of FIG. 4 is a cross sectional view of the oscillator; and (c) of FIG. 4 is a bottom view of the oscillator.

Figure 5:
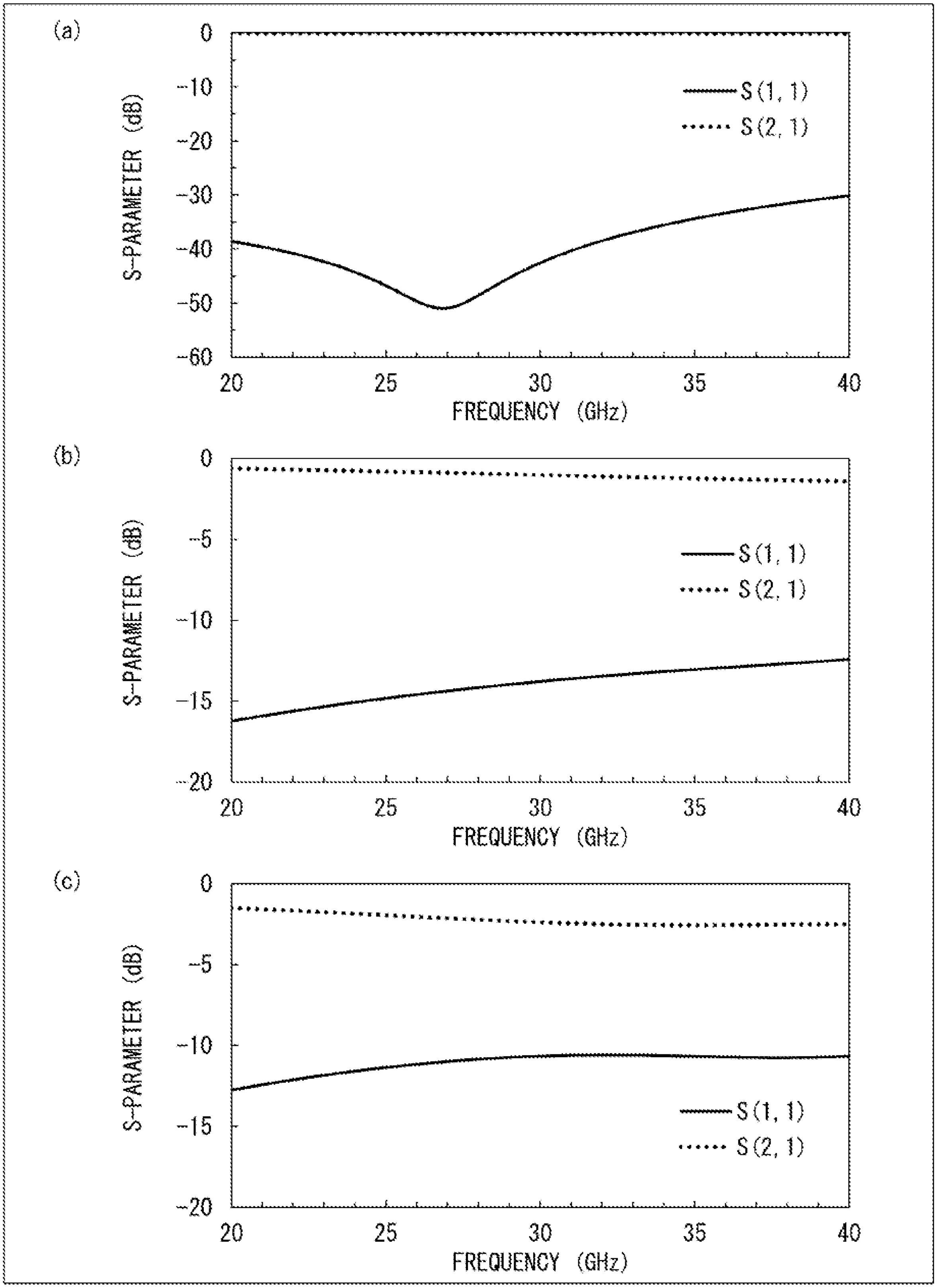

(a) and (b) of FIG. 5 are graphs showing frequency in GHz dependence of S-parameters in dB of Examples 1 and 2 of a waveguide device in accordance with an embodiment of the present invention; and (c) of FIG. 5 is a graph showing S-parameters in dB of a Comparative Example of the waveguide device illustrated in FIG. 1.

Figure 6:
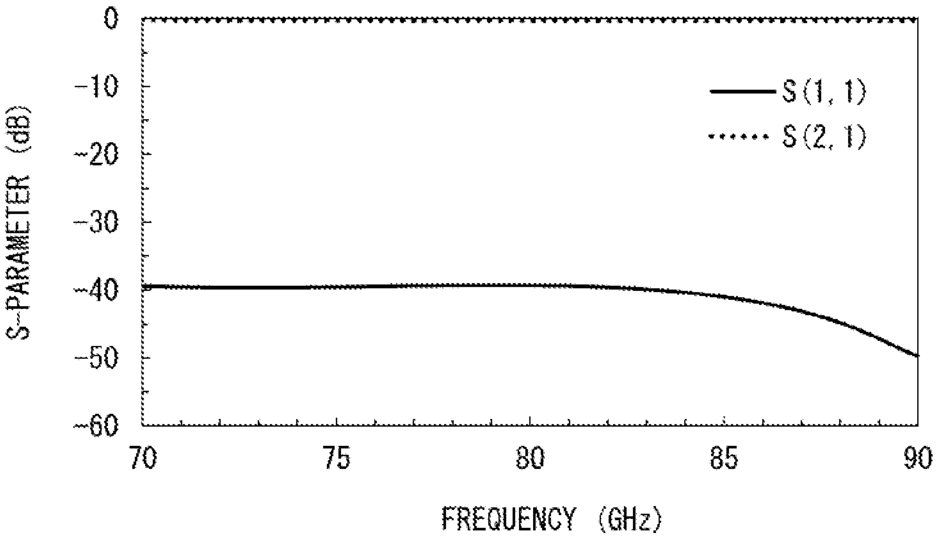

FIG. 6 is a graph showing S-parameters in dB of the Example 3 of the waveguide device illustrated in FIG. 1.

DETAILED DESCRIPTION OF THE EMBODIMENTS

Embodiment 1

The following will discuss a waveguide device 10 in accordance with Embodiment 1 of the present invention, with reference to FIG. 1. (a) of FIG. 1 is a top view of the waveguide device 10. (b) of FIG. 1 is a cross sectional view of the waveguide device 10 taken along straight line A-A' shown in (a) and (c) of FIG. 1. (c) of FIG. 1 is a bottom view of the waveguide device 10.

(Waveguide Device 10)

As illustrated in FIG. 1, the waveguide device 10 includes a substrate 11 (see (b) of FIG. 1), a conductor layer 12A (see (b) of FIG. 1), a conductor layer 12B (see (b) of FIG. 1), a dielectric layer 13A (see (a) and (b) of FIG. 1), a dielectric layer 13B (see (b) and (c) of FIG. 1), a long narrow conductor 14A (see (a) and (b) of FIG. 1), a long narrow conductor 14B (see (b) and (c) of FIG. 1), a conductor pad 15A (see (a) and (b) of FIG. 1), a conductor pad 15B (see (b) and (c) of FIG. 1), a via group 16A (see (a) of FIG. 1), a via group 16B (see (c) of FIG. 1), a conductor pad 17A (see (a) of FIG. 1), a conductor pad 17B (see (c) of FIG. 1), a via group 18A (see (a) of FIG. 1), a via group 18B (see (c) of FIG. 1), a main conductor post MP (see (a) to (c) of FIG. 1), and sub-conductor posts SP1 to SP7 (see (a) and (c) of FIG. 1). Note that only SP1, SP4 and SP7 are labeled in (a) and (c) of FIG. 1).

(Substrate 11)

The substrate 11 is a substrate made of a dielectric (quartz in Embodiment 1). Among surfaces of the substrate 11, a planar region having a large surface area will be hereinafter referred to as a "main surface". This means that the substrate 11 has two main surfaces, one main surface of which is on a positive side in a z axis direction in a coordinate system shown in FIG. 1 (hereinafter, referred to as a "front surface") and the other one of which is on a negative side in the z axis direction in the coordinate system shown in FIG. 1 (hereinafter, referred to as a "back surface"). The front surface and the back surface are one aspect of both main surfaces.

In a portion of a region of the substrate 11, a through-hole is formed to penetrate through the front surface and the back surface (in FIG. 1, a through-hole where the main conductor post MP (described later) is formed) and a through-hole group which includes seven through-holes penetrating through the front surface and the back surface (in FIG. 1, through-holes where the sub-conductor posts SP1 to SP7 (described later) are formed).

(Conductor Layers 12A and 12B)

The conductor layer 12A is made of a conductor film which is formed on the front surface of the substrate 11. In Embodiment 1, the conductor layer 12A is made of copper. The conductor film is removed in a circular shape in a partial region which is in the conductor layer 12A and which, when seen in plan view, includes the through-hole where the main conductor post MP is formed in the substrate 11. Consequently, in that region of the conductor layer 12A, a circular opening 12A1 is formed (see (a) and (b) of FIG. 1). The conductor layer 12A is an aspect of a first conductor layer.

The conductor layer 12B is made of a conductor film which is formed on the back surface of the substrate 11. In Embodiment 1, the conductor layer 12B is made of copper. The conductor film is removed in a circular shape in a partial region of the conductor layer 12B or a region which, when seen in plan view, includes the through-hole where the main conductor post MP is formed in the substrate 11. As a result, in that region of the conductor layer 12B, a circular opening 12B1 is formed (see (b) and (c) of FIG. 1). In Embodiment 1, the opening 12B1 is formed so as to overlap with the opening 12A1 when seen in plan view (see (b) of FIG. 1). The conductor layer 12B is an aspect of a second conductor layer.

(Main Conductor Post MP)

The main conductor post MP is a tubular member made of a conductor (in Embodiment 1, made of copper), and is obtained by forming a copper conductor film on an inner wall of the above-described through-hole of the substrate 11 (see (b) of FIG. 1). The main conductor post MP is not electrically connected to each of the conductor layer 12A and the conductor layer 12B.

(Sub-Conductor Posts SP1 to SP7)

The sub-conductor posts SP1 to SP7 are tubular members made of a conductor (in Embodiment 1, made of copper). These sub-conductor posts SP1 to SP7 are obtained, as in the case of the main conductor post MP, by forming a copper conductor film on an inner wall of each of the through-holes constituting the above-described through-hole group of the substrate 11. Each of the sub-conductor posts SP1 to SP7 forms a short circuit between the conductor layer 12A and the conductor layer 12B.

Embodiment 1 employs seven sub-conductor posts SP1 to SP7. However, the number of the sub-conductor posts is not limited, and may be one or any number of two or more.

The sub-conductor posts SP1 to SP7, together with the main conductor post MP, constitute a pseudo-coaxial waveguide which guides electromagnetic waves. Therefore, the waveguide including the main conductor post MP and the sub-conductor posts SP1 to SP7 can guide a TEM mode or a quasi-TEM mode in a low-loss condition.

When the conductor layer 12A is seen in plan view, respective central axes of the sub-conductor posts SP1 to SP7 are arranged on the circumference of a circle which has a radius R1 (see (b) of FIG. 1) and which has a center at the position of the central axis of the main conductor post MP (see (a) and (b) of FIG. 1). Therefore, respective distances between the main conductor post MP and the sub-conductor posts SP1 to SP7 are designed to be equal to each other. Although it is assumed that there may be a case where the respective distances between the main conductor post MP and the sub-conductor posts SP1 to SP7 vary due to, for example, an error in designing, it is preferable that the distances be equal to each other. It should be noted that in a state in which the respective distances vary due to, for example, an error after designing although the respective distances have been designed so as to be equal to each other, the distances can be regarded as substantially equal to each other.

Further, in Embodiment 1, in a case where the circumference of the circle, which has the radius R1 and which has the center at the position of the central axis of the main conductor post MP, is likened to a clock, the respective central axes of the sub-conductor posts SP1 to SP7 are arranged at positions corresponding to an hour hand indicating 10:30, 12:00, 1:30, 3:00, 4:30, 6:00, and 7:30, respectively. In other words, when the conductor layer 12A is seen in plan view, the respective central axes of the sub-conductor posts SP1 to SP7 are arranged in an isotropic manner except for a position overlapping with the long narrow conductor 14A and the long narrow conductor 14B (position of the hour hand indicating 9:00) among the above positions which divide the circumference into eight equal portions (see (a) and (b) of FIG. 1). The long narrow conductor 14A and the long narrow conductor 14B will be described later.

As described above, it is preferable that the sub-conductor posts SP1 to SP7 be arranged in a region which does not overlap with the long narrow conductor 14A or the long narrow conductor 14B, which will be described later, when the conductor layer 12A is seen in plan view (see (a) and (c) of FIG. 1). This is because in a case where any of the sub-conductor posts SP1 to SP7 is arranged in, for example, the region overlapping the long narrow conductor 14A when the conductor layer 12A is seen in plan view, the conductor layer 12A, which functions as a ground layer of the long narrow conductor 14A, is not uniform. This leads to an increase in transmission loss.

(Dielectric Layers 13A and 13B)

The dielectric layer 13A is made of a dielectric film which is formed on a surface of the conductor layer 12A on a side opposite to a side where the substrate 11 is provided. In Embodiment 1, the dielectric layer 13A is made of a polyimide resin. In a partial region of the dielectric layer 13A or a region which, when seen in plan view, includes the through-hole formed in the substrate 11 (the through-hole where the main conductor post MP is formed), a circular opening is formed (see (a) of FIG. 1).

The dielectric layer 13B is made of a dielectric film which is formed on a surface of the conductor layer 12B on a side opposite to a side where the substrate 11 is provided. In Embodiment 1, the dielectric layer 13B is made of a polyimide resin. In a partial region of the dielectric layer 13B or a region which, when seen in plan view, includes the through-hole formed in the substrate 11 (the through-hole where the main conductor post MP is formed), a circular opening is formed.

(Microstrip Type Line on Front Surface Side)

The long narrow conductor 14A is made of a conductor film which is formed on a surface of the dielectric layer 13A on a side opposite to a side where the conductor layer 12A is provided. The long narrow conductor 14A is an aspect of a first long narrow conductor. In Embodiment 1, the long narrow conductor 14A is made of copper. In Embodiment 1, the long narrow conductor 14A is divided into three portions including a main portion 14A1, a conductor pad 14A2, and a conductor pad 14A3 (see (a) and (b) of FIG. 1). The following will discuss the shape of those portions (see (a) of FIG. 1).

The main portion 14A1 has a rectangular shape arranged such that long sides of the rectangular shape are along a y axis direction in the coordinate system shown in FIG. 1.

In Embodiment 1, the conductor pad 14A2 constituting one end of the long narrow conductor 14A has a circular shape arranged such that a radius of the circular shape is longer than the length of a short side of the main portion 14A1. The conductor pad 14A2 is provided in the region including the opening formed in the dielectric layer 13A described above (see (a) and (b) of FIG. 1), when seen in plan view.

In Embodiment 1, the conductor pad 14A3 constituting the other end of the long narrow conductor 14A has a square shape arranged such that each side of the square shape is longer than the length of the short side of the main portion 14A1.

Each of the conductor pad 15A and the conductor pad 17A is made of a conductor film which is formed on the surface of the dielectric layer 13A on the side opposite to the side where the conductor layer 12A is provided. Each of the conductor pad 15A and the conductor pad 17A has a rectangular shape arranged such that all sides of the rectangular shape are longer than the sides of the conductor pad 14A3. The conductor pad 15A and the conductor pad 17A are provided such that the conductor pad 14A3 is between the conductor pad 15A and the conductor pad 17A. The conductor pad 15A is provided on a positive side in an x axis direction in the coordinate system shown in FIG. 1. Meanwhile, the conductor pad 17A is provided on a negative side in the x axis direction in the coordinate system shown in FIG. 1.

The via group 16A includes a plurality of through vias which are formed so as to penetrate through the dielectric layer 13A. The via group 16A is provided in a region included in the conductor pad 15A when viewed in a plan view, and forms a short circuit between the conductor layer 12A and the conductor pad 15A (see (a) of FIG. 1).

The via group 18A is arranged like the via group 16A. The via group 18A is provided in a region included in the conductor pad 17A when seen in plan view, and forms a short circuit between the conductor layer 12A and the conductor pad 17A (see (a) of FIG. 1).

The conductor pad 15A, the conductor pad 14A3, and the conductor pad 17A arranged as above can be each suitably used as a connecting terminal in a ground-signal-ground (G-S-G) arrangement. To such a connecting terminal, a transistor or the like can be easily connected.

The long narrow conductor 14A and the conductor layer 12A arranged as described above constitute a microstrip type line formed on the front surface side of the substrate 11 (on the positive side in the z axis direction in the coordinate system shown in FIG. 1). This microstrip type line is one aspect of a first line, and can guide a TEM mode or a quasi-TEM mode in a low-loss condition.

(Microstrip Type Line on Back Surface Side)

The long narrow conductor 14B is made of a conductor film which is formed on a surface of the dielectric layer 13B on a side opposite to a side where the conductor layer 12B is provided. The long narrow conductor 14B is an aspect of a third long narrow conductor. The long narrow conductor 14B is arranged in the same manner as the long narrow conductor 14A except that the long narrow conductor 14B is formed on the surface of the dielectric layer 13B but not on the surface of the dielectric layer 13A (see (c) of FIG. 1). Specifically, the long narrow conductor 14B includes a main portion 14B1, a conductor pad 14B2, and a conductor pad 14B3 (see (b) and (c) of FIG. 1), which correspond to the main portion 14A1, the conductor pad 14A2, and the conductor pad 14A3 (see (a) and (b) of FIG. 1), respectively.

Similarly, (1) the conductor pad 15B and the conductor pad 17B are arranged in the same manner as the conductor pad 15A and the conductor pad 17A, respectively and (2) the via group 16B and the via group 18B are arranged in the same manner as the via group 16A and the via group 18A, respectively, except that the conductor pad 15B and the conductor pad 17B and the via group 16B and the via group 18B are formed on the surface of the dielectric layer 13B but not on the surface of dielectric layer 13A.

Therefore, Embodiment 1 omits detailed descriptions of the long narrow conductor 14B, the conductor pad 15B, the via group 16B, the conductor pad 17B, and the via group 18B.

The long narrow conductor 14B and the conductor layer 12B arranged as described above constitute a microstrip type line formed on the back surface side of the substrate 11 (on the negative side in the z axis direction in the coordinate system shown in FIG. 1). This microstrip type line is one aspect of a third line, and can guide a TEM mode or a quasi-TEM mode in a low-loss condition.

(Connection Between Lines on Front and Back Surface Sides)

In Embodiment 1, an air-core cylindrical conductor is formed in a region included in the opening 12A1, when seen in plan view. This conductor forms a short circuit between the long narrow conductor 14A and the main conductor post MP (see (b) of FIG. 1). In (b) of FIG. 1, the air-core cylindrical conductor is not given any reference numeral.

Similarly, another air-core cylindrical conductor is formed in a region included in the opening 12B1, when seen in plan view. This conductor forms a short circuit between the long narrow conductor 14B and the main conductor post MP (see (b) of FIG. 1). This consequently forms a short circuit between the long narrow conductor 14A and the long narrow conductor 14B.

In addition, the sub-conductor posts SP1 to SP7 each form a short circuit between the conductor layer 12A and the conductor layer 12B. Therefore, the microstrip type line formed on the front surface side, and the microstrip type line formed on the back surface side are connected to each other.

As described above, all of (i) a line including the main conductor post MP and the sub-conductor posts SP1 to SP7, (ii) the microstrip type line on the front surface side, and (iii) the microstrip type line on the back surface side can guide a TEM mode or a quasi-TEM mode in a low-loss condition. Therefore, the waveguide device 10 makes it possible to reduce loss that may occur in cases where electromagnetic waves are guided from the front surface side to the back surface side of the substrate 11 or from the back surface side to the front surface side of the substrate 11.

(Variations of Lines on Front and Back Surface Sides)

In Embodiment 1, the microstrip type line is employed as each of lines on the front surface side of the substrate 11 and on the back surface side of the substrate 11. However, these lines are not limited to the microstrip type lines. Each of these lines may be, for example, a coplanar type line, or a coaxial or pseudo-coaxial line. It is preferable that these lines, like the line including the main conductor post MP and the sub-conductor posts SP1 to SP7, be capable of guiding a TEM mode or a quasi-TEM mode in a low-loss condition.

Further, an aspect of the line on the front surface side of the substrate 11 may be same as or different from an aspect of the line on the back surface side of the substrate 11.

[Variations 1 to 4]

The following will discuss Variations 1 to 4 of the waveguide device 10, with reference to (a) to (d) of FIG. 2. (a) to (d) of FIG. 2 are respective top views illustrating Variations 1 to 4 of the waveguide device 10.

A waveguide device 10 of Variation 1 includes one sub-conductor post SP1 (see (a) of FIG. 2). The sub-conductor post SP1 is arranged in parallel to the main conductor post MP. Though there is only one sub-conductor post SP1, this arrangement allows the line including the main conductor post MP and the sub-conductor post SP1 to guide a TEM mode or a quasi-TEM mode in a low-loss condition as compared with a case where no sub-conductor post SP1 is provided.

A waveguide device 10 of Variation 2 is provided with two sub-conductor posts SP1 and SP2 (see (b) of FIG. 2).

A waveguide device 10 of Variation 3 is provided with six sub-conductor posts SP1 to SP6 (see (c) of FIG. 2). Note that only SP1 and SP6 are labeled in (c) of FIG. 2.

A waveguide device 10 of Variation 4 is provided with eight sub-conductor posts SP1 to SP8 (see (d) of FIG. 2). Note that only SP1 and SP8 are labeled in (d) of FIG. 2.

Hereinafter, in a case where it is not necessary to particularly specify the number of the sub-conductor posts, the sub-conductor post(s) is/are referred to as "sub-conductor post(s) SPi", where i is any positive integer.

As the number of the sub-conductor posts SPi increases, the pseudo-coaxiality of the line including the main conductor post MP and the sub-conductor posts SPi increases. However, as the number of the sub-conductor posts SPi increases, the strength of the substrate 11 decreases in a region including the main conductor post MP since the sub-conductor posts SPi are through-holes (as described above). In view of the above-described advantage and disadvantage, the number of the sub-conductor posts SPi can be appropriately designed.

Further, in the waveguide devices 10 of Variations 2 to 4, the sub-conductor posts SPi are arranged so as to surround the main conductor post MP in an isotropic manner. In other words, in each of the waveguide devices 10 of Variations 2 to 4, a pattern in which the sub-conductor posts SPi are arranged has n-fold rotational symmetry. Here, n can be any integer selected from positive integers. In the waveguide device 10 of Variation 2, n=2; in waveguide device 10 of Variation 3, n=6; and in the waveguide device 10 of Variation 4, n=8.

It is preferable that in the waveguide device 10, the sub-conductor posts SPi be arranged so as to surround the main conductor post MP in an isotropic manner, as described above.

Embodiment 2

The following will discuss a waveguide device 10A in accordance with Embodiment 2 of the present invention, with reference to FIG. 3. (a) of FIG. 3 is a cross sectional view of the waveguide device 10A taken along straight line A-A' shown in (b) of FIG. 3. (b) of FIG. 3 is a bottom view of the waveguide device 10A.

In a comparison between the waveguide device 10A and the waveguide device 10 illustrated in FIG. 1, the waveguide device 10A is obtained by (i) omitting the microstrip type line on the back surface side of the substrate 11 from the waveguide device 10 in (a) of FIG. 1 and (ii) adding a coaxial connecting port on the back surface side of the substrate 11. To this connecting port, it is possible to connect a coaxial line, or alternatively to connect a line which is provided in a circuit board 50 (a line including a ground layer 52 and a signal line 53 which are formed on a front surface of a substrate 51), which will be described later with reference to FIG. 4. In Embodiment 2, the following will discuss the connecting port and a connecting member for connecting the coaxial line. It should be noted that the coaxial line refers to a line which includes: a center conductor provided in a center portion of the line; a coaxial insulation layer surrounding the outside of the center conductor; and a coaxial outer conductor surrounding the outside of the insulating layer.

It should be noted that among members constituting the waveguide device 10A, members identical to those constituting the waveguide device 10 are given identical reference numerals, respectively, and descriptions thereof will not be repeated.

In the waveguide device 10A, a conductor film is removed in an annular shape in a partial region of a conductor layer 12B, that is, a region surrounding a through-hole where a main conductor post MP is formed in a substrate 11, when seen in plan view (see (b) of FIG. 3). As a result, the conductor layer 12B of the waveguide device 10A has a circular opening 12B1 which is formed so as to surround the through-hole. Further, inside the opening 12B1, an annular conductor pad 12B2 is formed so as to be spaced apart from an edge of the opening 12B1. As illustrated in (a) of FIG. 3, the conductor pad 12B2 is short-circuited to the main conductor post MP.

It is possible to connect the center conductor of the coaxial line to the conductor pad 12B2. Further, it is possible to connect the outer conductor of the coaxial line to the partial region of the conductor layer 12B outside the opening 12B1. Therefore, the conductor pad 12B2 and that region of the conductor layer 12B outside the opening 12B1 constitute a connecting port for connecting the coaxial line.

As the connecting member for connecting the coaxial line and the connecting port to each other, it is possible to suitably use, for example, a solder ball SB and a solder conductor ring CR as illustrated in (a) and (b) of FIG. 3.

The solder ball SB includes: a core which is made of a resin spherical member; and a solder layer which covers the surface of the core. Connecting the center conductor and the conductor pad 12B2 to each other with use of the solder ball SB makes it possible to prevent solder from flowing into the main conductor post MP in connecting the center conductor and the conductor pad 12B2. Further, it is possible to reliably connect the center conductor and the conductor pad 12B2 to each other.

When the coaxial line is connected to the connecting port, the waveguide device 10A can reduce loss that may occur in a case where electromagnetic waves are guided between a microstrip type line provided on a front surface side of the substrate 11 shown in (b) of FIG. 4 and the coaxial line provided on the back surface side of the substrate 11.

In Embodiment 2, the waveguide device 10A shown in (a) of FIG. 4 is configured by adding a sub-conductor post SP8 to the above-described position of the hour hand indicating 9:00 in the waveguide device 10 shown in (a) of FIG. 1. As described above, when the conductor layer 12A is seen in plan view, it is preferable that a long narrow conductor 14A be provided at a position which does not overlap with any sub-conductor post(s) SPi. However, in one aspect of the present invention, the sub-conductor post SP8, which is one of a plurality of sub-conductor posts, may be formed at the position overlapping with the long narrow conductor 14A as shown in (a) and (b) of FIG. 4 when the conductor layer 12A is seen in plan view. Since the long narrow conductor 14A is supported by a dielectric layer 13A, the long narrow conductor 14A can keep its shape even in a case where the long narrow conductor 14A overlaps with the opening of the sub-conductor post SP8.

Embodiment 3

The following will discuss an oscillator 1 in accordance with Embodiment 3 of the present invention, with reference to FIG. 4. (a) of FIG. 4 is a top view of an oscillator 1. (b) of FIG. 4 is a cross sectional view of the oscillator 1 taken along line A-A' shown in (a) and (c) of FIG. 4. (c) of FIG. 4 is a bottom view of the oscillator 1.

As illustrated in (a) to (c) of FIG. 4, the oscillator 1 includes a waveguide device 10A, a waveguide device 20, a transistor 30, and a plurality of solder balls.

(Waveguide Device 10A)

The waveguide device 10A in accordance with Embodiment 3 has a configuration which is similar to that of the waveguide device 10A illustrated in FIG. 3 and in which the length of long sides of a substrate 11 is extended. Each of a conductor layer 12A and a dielectric layer 13A are provided on a front surface side of the substrate 11, while a conductor layer 12B is formed on a back surface of the substrate 11. Therefore, in the waveguide device 10A in accordance with Embodiment 3 of the present invention, each of the conductor layer 12A, the dielectric layer 13A, and the conductor layer 12B has long sides having an extended length as compared with those in the waveguide device 10A illustrated in FIG. 3.

Except for the above-described configuration, the waveguide device 10A in accordance with Embodiment 3 of the present invention has the same configuration as the waveguide device 10A illustrated in FIG. 3. Therefore, in Embodiment 3, a detailed description of the waveguide device 10A is omitted.

(Waveguide Device 20)

As illustrated in (b) of FIG. 4, the waveguide device 20 shares the substrate 11, the conductor layer 12A, the dielectric layer 13A, and the conductor layer 12B with the waveguide device 10A. In other words, the waveguide device 20 is formed in a partial region of the substrate 11. This region is different from a region where the waveguide device 10A is formed.

The waveguide device 20 includes the substrate 11, the conductor layer 12A, the dielectric layer 13A, the conductor layer 12B, a conductor post group CPG, and a long narrow conductor 24A. The long narrow conductor 24A is an aspect of a second long narrow conductor.

Since as described above, the waveguide device 20 is configured to share the substrate 11, the conductor layer 12A, the dielectric layer 13A, and the conductor layer 12B with the waveguide device 10A, descriptions thereof will be omitted.

<Resonance Region 29>

The conductor post group CPG is constituted by 20 conductor posts CP1 to CP20. Note that for the sequence of CP1 to CP20, only CP1, CP6, CP11, CP16 and CP20 are labeled in (a) and (c) of FIG. 1). Hereinafter, in a case where it is not necessary to particularly specify each of the conductor posts CP1 to CP20, the sub-conductor post(s) is/are referred to as "conductor post(s) CPj", where j is any positive integer.

The conductor post CPj, like the main conductor post MP and the sub-conductor post SPi of the waveguide device 10A, is obtained by forming a through-hole in the substrate 11, and further forming a copper conductor film on an inner wall of the through-hole. Therefore, description of the conductor post group CPG will deal with only an arrangement pattern of the conductor posts CPj.

When the dielectric layer 13A is seen in plan view, the conductor posts CPj are arranged such that a line connecting respective central axes of the conductor posts CPj has a quadrangular shape (in Embodiment 3, a square shape) (see (a) and (c) of FIG. 4). The four conductor posts CP1, CP6, CP11, and CP16 are arranged such that respective central axes of the four conductor posts form four corners of the square shape. The conductor posts CP2 to CP5 (not labeled in (a) and (c) of FIG. 4) are arranged so as to be aligned at equal intervals on a straight line connecting the center of the conductor post CP1 and the center of conductor post CP6. The conductor posts CP7 to CP10 (not labeled in (a) and (c) of FIG. 4) are arranged so as to be aligned at equal intervals on a straight line connecting the center of the conductor post CP6 and the center of conductor post CP11. The conductor posts CP12 to CP15 (not labeled in (a) and (c) of FIG. 4) are arranged so as to be aligned at equal intervals on a straight line connecting the center of the conductor post CP11 and the center of conductor post CP16. The conductor posts CP17 to CP20 (CP17 to CP19 are not labeled in (a) and (c) of FIG. 4) are arranged so as to be aligned at equal intervals on a straight line connecting the center of the conductor post CP16 and the center of conductor post CP1.

It should be noted that in (a) and (c) of FIG. 4, only the conductor posts CP1, CP6, CP11, and CP16 among the conductor posts CPj are given reference numerals.

The conductor post group CPG is constituted by the conductor posts CP1 to CP20 in a palisade arrangement as described above, and functions as a post wall which reflects electromagnetic waves. The interval between a conductor post CPj and another conductor post CPj+1 may be designed as appropriate so as to reflect electromagnetic waves in a desired band (predetermined band including a resonance frequency as described later).

The conductor post group CPG, the conductor layer 12A, and the conductor layer 12B surround a region which forms a resonance region 29.

The resonance region 29 has a resonance frequency in accordance with the shape and size of the resonance region 29. The oscillator 1 includes the transistor 30, which will be described later, and the resonance region 29. This makes it possible to produce (oscillate) electromagnetic waves in the above-described predetermined band.

(Microstrip Type Line on Front Surface Side)

The long narrow conductor 24A is made of a conductor film which is formed on the dielectric layer 13A. The long narrow conductor 24A is an aspect of the second long narrow conductor. The long narrow conductor 24A is arranged in the same manner as the long narrow conductor 14A except that the long narrow conductor 24A is formed in a different region of the dielectric layer 13A (see (a) of FIG. 4). Specifically, the long narrow conductor 24A has a main portion 24A1, a conductor pad 24A2, and another conductor pad 24A3, which correspond to the main portion 14A1, the conductor pad 14A2, and the conductor pad 14A3 of the long narrow conductor 14A, respectively.

Similarly, a conductor pad 25A and a conductor pad 27A are arranged in the same manner as the conductor pad 15A and the conductor pad 17A except that the conductor pad 25A and the conductor pad 27A are formed in a different region of the dielectric layer 13A. Further, although not illustrated in (a) of FIG. 4, via groups are formed below the conductor pad 25A and the conductor pad 27A, respectively, in the same manner as the via group 16A and the via group 18A both of which are explained in (a) of FIG. 1.

Therefore, Embodiment 3 omits detailed descriptions of the long narrow conductor 24A, the conductor pad 25A, the conductor pad 27A, and the via groups.

The long narrow conductor 24A and the conductor layer 12A arranged as described above constitute a microstrip type line formed on the front surface side of the substrate 11 (on a positive side in a z axis direction in a coordinate system shown in FIG. 4). This microstrip type line is one aspect of a second line, and allows a TEM mode or a quasi-TEM mode to be guided.

In Embodiment 3, the microstrip type line is employed as a line of the waveguide device 20. However, the line of the waveguide device 20 is not limited to the microstrip type line, and may be, for example, a coplanar type line.

(Blind Via BB)

In the conductor layer 12A, a region including the center of the resonance region 29 includes an opening 12A2 having a circular shape, when seen in plan view (see (a) of FIG. 4). Here, the center of the resonance region 29 refers to an intersection of two diagonals of the square shape described above (an intersection of (i) a straight line connecting the center of the conductor post CP1 and the center of the conductor post CP11 and (ii) a straight line connecting the center of the conductor post CP6 and the center of the conductor post CP16).

In a region which is included in the opening 12A2 when seen in plan view and which contains the center of the resonance region 29 when seen in plan view, a blind via BB is provided (see (a) of FIG. 4). The blind via BB is formed toward the inside of the resonance region 29 from the front surface side of the substrate 11. The blind via BB is obtained by (i) forming a non-through-hole toward the inside of the substrate 11 from the front surface side of the substrate 11, and further (ii) forming a copper conductor film on an inner wall of the non-through-hole. Though the copper conductor film is used in Embodiment 3, embodiments of the present invention are not limited to such a configuration.

An air-core cylindrical conductor is formed in a region included in the opening 12A2 when seen in plan view (see (b) of FIG. 4). This conductor forms a short-circuit between the long narrow conductor 24A and the blind via BB. In (b) of FIG. 4, this conductor is not given any reference numeral. The shape of the conductor is not limited to the air-core cylindrical shape, and can be appropriately determined.

The short circuit between the long narrow conductor 24A and the blind via BB is formed by the air-core cylindrical conductor described above.

(Transistor 30)

The transistor 30 has a function as an amplifier. The transistor 30 amplifies electromagnetic waves in a predetermined band including the resonance frequency of the resonance region 29, and outputs amplified electromagnetic waves to the outside.

The transistor 30 has an input port and an output port. The input port has: a signal line that is connected, with use of a solder ball, to a conductor pad 24A3 which is an end of the long narrow conductor 24A; and a ground line that is connected, with use of solder balls, to the conductor pad 25A and the conductor pad 27A. The output port has a signal line that is connected, with use of a solder ball, to the conductor pad 14A3 which is an end of the long narrow conductor 14A, and a ground line that is connected, with use of solder balls, to the conductor pad 15A and the conductor pad 17A. In Embodiment 3, the conductor pad 24A3 and the transistor 30 are connected to each other with use of a solder ball, and the conductor pad 14A3 and the transistor 30 are connected to each other with use of a solder ball. It should be noted, however, that for connection between the conductor pad 24A3 and the transistor 30 and connection between the conductor pad 14A3 and the transistor 30, solder may be used in place of the solder balls.

(Circuit Board 50)

The oscillator 1 can guide electromagnetic waves, which are outputted by the transistor 30, in a low-loss condition from the front surface side to the back surface side of the substrate 11. Therefore, simply connecting the oscillator 1 to a surface of a substrate (for example, the circuit board 50, illustrated in (b) of FIG. 4) different from the substrate 11 makes it possible to supply, to the circuit board 50, electromagnetic waves outputted by the transistor 30.

The circuit board 50 includes, for example: a substrate 51 made of, for example, a resin; a ground layer 52 formed on the front surface of the substrate 51; and a signal line 53 formed in a region which is on the front surface of the substrate 51 and which is different from a region where the ground layer 52 is formed. The substrate 51 is a so-called "printed circuit board".

The conductor layer 12B of the waveguide device 10A is connected to the ground layer 52 with use of a solder ball, and the conductor pad 12B2 of the waveguide device 10A is connected to the signal line 53 with use of another solder ball. Although in Embodiment 3, the conductor layer 12B and the ground layer 52 are connected to each other with use of a solder ball, solder may be used in place of the solder ball to connect the conductor layer 12B and the ground layer 52 to each other. It should be noted, however, that when the conductor pad 12B2 and the signal line 53 are connected to each other with use of solder, the solder may flow into the inside of the main conductor post MP. Therefore, it is preferable that the conductor pad 12B2 and the signal line 53 be connected to each other with use of the solder ball.

In this way, connecting the waveguide device 10A to the circuit board 50 allows the oscillator 1 to easily supply, in a low-loss condition to the circuit board 50, electromagnetic waves which are outputted by the transistor 30.

Examples 1 to 3

FIGS. 5(*a*), 5(*b*) and 5(*c*) show frequency in GHz dependence of S-parameters in dB of each of Examples 1 and 2 of the waveguide device 10 in accordance with an embodiment of the present invention. FIG. 6 shows frequency in GHz dependence of S-parameters in dB of Example 3 of the waveguide device 10 in accordance with an embodiment of the present invention.

(a) of FIG. 5 is a graph showing the frequency in GHz dependence of the S-parameters S(1, 1) and S(2, 1) in dB of Example 1. (b) of FIG. 5 is a graph showing the frequency in GHz dependence of the S-parameters S(1, 1) and S(2, 1) in dB of Example 2. Further, (c) of FIG. 5 is a graph showing the frequency in GHz dependence of the S-parameter S(1, 1) and the S-parameter S(2, 1) of a Comparative Example of the waveguide device 10. FIG. 6 is a graph showing the frequency in GHz dependence of the S-parameters S(1, 1) and S(2, 1) in dB of Example 3.

Example 1 has a configuration of the waveguide device 10 illustrated in FIG. 1, and is designed such that a band of not less than 20 GHz to not more than 40 GHz is an operation band. In other words, Example 1 includes seven sub-conductor posts SPi. In addition, the substrate 11 was designed to employ a thickness of 520 μm and a radius R1 of 300 μm.

Example 2 has a configuration of the waveguide device 10 illustrated in (a) of FIG. 2, and is designed such that a band of not less than 20 GHz to not more than 40 GHz is an operation band. In other words, Example 2 includes one sub-conductor post SP1. The thickness of the substrate 11 and the radius R1 of the circle on which a central axis of the sub-conductor post SP1 is arranged are the same as those of Example 1.

Example 3 has a configuration of the waveguide device 10 illustrated in FIG. 1, and is designed such that a band of not less than 70 GHz to not more than 90 GHz is an operation band. In other words, Example 3 includes seven sub-conductor posts SPi, as in Example 1. In addition, the substrate 11 was designed to employ a thickness of the substrate of 520 μm and a radius R1 of the circle of 300 μm.

The Comparative Example is configured by omitting the seven sub-conductor posts SPi from Example 1. In other words, the Comparative Example does not include any sub-conductor post SPi. In the Comparative Example, the thickness of the substrate 11 is same as that in Examples 1 and 2.

The graphs of FIG. 5 show results of simulation of the frequency in GHz dependence of the S-parameter S(1, 1) and the S-parameter S(2, 1) for each of Example 1, Example 2, and the Comparative Example.

It has been found from (a) of FIG. 5 that in Example 1, (i) the level of the S-parameter S(2, 1) can be regarded as 0 dB in an entire range of the operation band, and (ii) the S-parameter S(1, 1) is below −30 dB in the entire range of the operation band.

On the other hand, it has been found from (c) of FIG. 5 that in the Comparative Example, (i) the minimum value of the S-parameter S(2, 1) is approximately −2.5 dB, and (ii) the S-parameter S(1, 1) is included in a range of not less than −13 dB and not more than −10 dB.

It has been therefore found that as compared to the Comparative Example, Example 1 can significantly reduce loss in the entire range of the operation band, in a case where electromagnetic waves are guided from the front surface side to the back surface side of the substrate 11 or from the back surface side to the front surface side of the substrate 11.

It has been found from (b) of FIG. 5 that in Example 2, the minimum value of the S-parameter S(2, 1) is approximately −1.5 dB and the S-parameter S(1, 1) is included in a range of not less than −16 dB and not more than −13 dB.

It has been therefore found that as compared to the Comparative Example, Example 2 can significantly reduce loss in an entire range of the operation band, in a case where electromagnetic waves are guided from the front surface side to the back surface side of the substrate 11.

It has been found from FIG. 6 that in Example 3, (i) the level of the S-parameter S(2, 1) can be regarded as 0 dB in an entire range of the operation band, and (ii) the S-parameter S(1, 1) is below −39 dB in the entire range of the operation band. It has been therefore found that Example 3 can reduce loss in the entire range of the operation band, in a case where electromagnetic waves are guided from the front surface side to the back surface side of the substrate 11 or from the back surface side to the front surface side of the substrate 11.

Aspects of the present invention can also be expressed as follows:

In order to solve the above problem, a waveguide device in accordance with Aspect 1 of the present invention includes: a substrate made of a dielectric; a first conductor layer and a second conductor layer which are formed on both main surfaces of the substrate, respectively; a main conductor post which penetrates between the both main surfaces and which is not electrically connected to the first conductor layer or the second conductor layer; and one or more sub-conductor posts which penetrate between the both main surfaces and which form a short circuit between the first conductor layer and the second conductor layer, the one or more sub-conductor posts, together with the main conductor post, guiding a TEM mode or a quasi-TEM mode.

The above configuration includes the sub-conductor posts which, together with the main conductor post, guide a TEM mode or a quasi-TEM mode. Therefore, as compared to a configuration including no sub-conductor post, the above configuration makes it possible to reduce loss that may occur in cases where a TEM mode or a quasi-TEM mode is guided from one main surface side of a substrate to the other main surface side of the substrate.

A waveguide device in accordance with Aspect 2 of the present invention is preferably configured to include a plurality of the sub-conductor posts in the above Aspect 1.

The above configuration makes it possible to further reduce the loss, as compared to a configuration in which the waveguide device includes one sub-conductor post.

A waveguide device in accordance with Aspect 3 of the present invention is preferably configured such that in the above Aspect 2, respective distances between the main conductor post and the sub-conductor posts are substantially equal to each other.

The above configuration makes it possible to reliably reduce the loss, as compared to a configuration in which the respective distances between the main conductor post and the sub-conductor posts differ from each other.

A waveguide device in accordance with Aspect 4 of the present invention is preferably configured such that in the above Aspect 2 or 3, the sub-conductor posts are configured so as to surround the main conductor post in an isotropic manner.

The above configuration can make the form of the waveguide device, which is formed by the main conductor post and the sub-conductor posts, more similar to a coaxial form. Therefore, the above configuration makes it possible to further reduce the loss, as compared to a configuration in which the sub-conductor posts are not configured in an isotropic manner.

A waveguide device in accordance with Aspect 5 of the present invention is preferably configured to further include, in any one of the above Aspects 1 to 4, a first line of a microstrip type or a coplanar type, the first line being formed on a first conductor layer side of the substrate and containing a first long narrow conductor which has one end short-circuited to the main conductor post and which, together with the first conductor layer, guides a TEM mode or a quasi-TEM mode.

The above configuration allows a TEM mode or a quasi-TEM mode to be coupled to the main conductor post by using the first line of a microstrip type or a coplanar type. Therefore, the above configuration makes it possible to reduce loss that may occur in a case where the first line is connected to the main conductor post.

A waveguide device in accordance with Aspect 6 of the present invention is preferably configured such that in the above Aspect 5, the one or more sub-conductor posts are provided in a region which does not overlap with the first long narrow conductor, when seen in plan view.

The above configuration makes it possible to further reduce transmission loss or return loss in the first long narrow conductor.

A waveguide device in accordance with Aspect 7 of the present invention is preferably configured to further include, in the above Aspect 5 or 6: a resonance region surrounded by a post wall, a part of the first conductor layer, and a part of the second conductor layer, the post wall being formed by a plurality of conductor posts which are provided in a palisade arrangement and which penetrate between the both main surfaces; a second line of a microstrip type or a coplanar type, the second line being formed on the first conductor layer side of the substrate and containing a second long narrow conductor which has one end electromagnetically connected to the resonance region and which, together with the first conductor layer, guides a TEM mode or a quasi-TEM mode; and a transistor connected to each of another end of the first long narrow conductor and another end of the second long narrow conductor.

The waveguide device configured as above can be suitably used as an oscillator.

A waveguide device in accordance with Aspect 8 of the present invention is preferably configured to further include, in any one of the above Aspects 1 to 7, a third line of a microstrip type or a coplanar type, the third line being formed on a second conductor layer side of the substrate and containing a third long narrow conductor which has one end short-circuited to the main conductor post and which, together with the second conductor layer, guides a TEM mode or a quasi-TEM mode.

The above configuration allows a TEM mode or a quasi-TEM mode to be coupled to the main conductor post by using the third line of a microstrip type or a coplanar type. Therefore, the above configuration makes it possible to reduce loss that may occur in a case where the third line is connected to the main conductor post.

A waveguide device in accordance with Aspect 9 of the present invention is preferably configured such that in the above Aspect 8, the one or more sub-conductor posts are provided in a region which does not overlap with the third long narrow conductor, when seen in plan view.

The above configuration makes it possible to further reduce transmission loss or return loss in the third long narrow conductor.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

10, 10A waveguide device
11 substrate
MP main conductor post
SP1 to SP8 sub-conductor post
12A, 12B conductor layer (first conductor layer, and second conductor layer)
R1 radius
13A, 13B dielectric layer
14A, 14B long narrow conductor (first long narrow conductor, and third long narrow conductor)
14A1, 14B1 main portion
14A2, 14B2 conductor pad (one end)
14A3, 14B3 conductor pad (the other (another) end)
CP1 to CP20 conductor post
CPG conductor post group (serving as a post wall)
1 oscillator
20 waveguide device
24A long narrow conductor (second long narrow conductor)
29 resonance region
30 transistor
1 oscillator

The invention claimed is:

1. A waveguide device comprising:

a substrate made of a dielectric;

a first conductor layer and a second conductor layer which are formed on both main surfaces of the substrate, respectively;

a main conductor post which penetrates between the both main surfaces and which is not electrically connected to the first conductor layer or the second conductor layer;

one or more sub-conductor posts which penetrate between the both main surfaces and which form a short circuit between the first conductor layer and the second conductor layer, the one or more sub-conductor posts, together with the main conductor post, guiding a TEM mode or a quasi-TEM mode;

a first line of a microstrip type or a coplanar type, the first line being formed on a first conductor layer side of the substrate and containing a first long narrow conductor which has one end short-circuited to the main conductor post and which, together with the first conductor layer, guides the TEM mode or the quasi-TEM mode;

a resonance region surrounded by a post wall, a part of the first conductor layer, and a part of the second conductor layer, the post wall being formed by a plurality of conductor posts which penetrate between the both main surfaces;

a second line of a microstrip type or a coplanar type, the second line being formed on the first conductor layer side of the substrate and containing a second long narrow conductor which has one end electromagnetically connected to the resonance region and which, together with the first conductor layer, guides the TEM mode or the quasi-TEM mode; and a transistor connected to each of another end of the first long narrow conductor and another end of the second long narrow conductor.

2. The waveguide device as set forth in claim 1, wherein the one or more sub-conductor posts include a plurality of sub-conductor posts.

3. The waveguide device as set forth in claim 2, wherein respective distances between the main conductor post and the sub-conductor posts are substantially equal to each other.

4. The waveguide device as set forth in claim 2, wherein the plurality of plurality of sub-conductor posts are arranged such that the sub-conductor posts have an n-fold rotational symmetry pattern around the main conductor post, where the n is any integer.

5. The waveguide device as set forth in claim 1, wherein the one or more sub-conductor posts are provided in a region which does not overlap with the first long narrow conductor, when seen in plan view.

6. The waveguide device as set forth in claim 1, further comprising a third line of a microstrip type or a coplanar type, the third line being formed on a second conductor layer side of the substrate and containing a third long narrow conductor which has one end short-circuited to the main conductor post and which, together with the second conductor layer, guides the TEM mode or the quasi-TEM mode.

7. The waveguide device as set forth in claim 6, wherein the one or more sub-conductor posts are provided in a region which does not overlap with the third long narrow conductor, when seen in plan view.

* * * * *